United States Patent [19]

Zabar et al.

[11] Patent Number: 5,539,651

[45] Date of Patent: Jul. 23, 1996

[54] APPARATUS AND METHOD FOR DETERMINING THE EFFECTS OF HARMONICS ON ELECTRIC POWER SYSTEMS

[75] Inventors: Zivan Zabar, Rego Park; Ralph Mancini, Brooklyn; Leo Birenbaum, Bronx, all of N.Y.

[73] Assignee: Long Island Lighting Company, Hicksville, N.Y.

[21] Appl. No.: 164,331

[22] Filed: Dec. 9, 1993

[51] Int. Cl.⁶ .................................................. G01R 19/06
[52] U.S. Cl. ......................... 364/483; 364/492; 364/484; 324/623
[58] Field of Search ................... 324/623, 76.12, 324/76.13, 76.19; 364/483, 484, 485, 492; 363/1; 323/220, 234, 304; 307/43, 200.1

[56] References Cited

U.S. PATENT DOCUMENTS

| | | | |
|---|---|---|---|
| 3,903,399 | 9/1975 | Enns et al. | 235/151.21 |
| 4,661,769 | 4/1987 | Girgis | 324/78 Z |
| 4,818,947 | 4/1989 | Zucker et al. | 324/57 |
| 4,871,971 | 10/1989 | Jeerings et al. | 324/509 |
| 5,072,187 | 12/1991 | Shilo | 324/623 |
| 5,179,376 | 1/1993 | Pomatte | 340/870.02 |
| 5,298,888 | 3/1994 | McEachern et al. | 340/660 |
| 5,301,121 | 4/1994 | Garverick et al. | 364/483 |
| 5,334,877 | 8/1994 | Mohan et al. | 307/46 |
| 5,343,079 | 8/1994 | Mohan et al. | 307/105 |
| 5,347,464 | 9/1994 | McEachern et al. | 364/483 |

OTHER PUBLICATIONS

Sharma et al., "An Iterative Approach for Analysis of Harmonic Penetration in the Power Transmission Networks", Oct. 1991.

Williams et al., "Harmonic Propagation on an Electric Distribution System: Field Measurements Compared with Computer Simulation", Apr. 1993.
Williamson et al., "Harmonic Analysis of Spacecraft Power Systems Using a Personal Computer", 1989.
Valcáreel et al., "Harmonic Power Flow for Unbalanced Systems", Oct. 1993.
Fleming et al., "Harmonic Analysis of a Reduced SaskPower Transmission Network Using an Iterative Approach", 1991.
Caramia et al., "Probabilistic Iterative Harmonic Analysis of Power Systems", Jul. 1994.
Grebe et al., "Software Analyzer Harmonics", Aug. 1993.
Mathews, *Numerical Method*, p. 116, 1992.

*Primary Examiner*—Ellis B. Ramirez
*Assistant Examiner*—Patrick J. Assovad
*Attorney, Agent, or Firm*—Dilworth & Barrese

[57] ABSTRACT

The present invention relates to a system and method for determining the effects of linear and nonlinear loads on electrical power systems. The invention utilizes stored load characteristic data in terms of current spectra at predefined voltage values and network impedances to determine the voltage drop between an electrical substation bus and an electrical load bus. The actual load voltage is determined by an iteration technique which takes the difference between a collected substation voltage and the voltage drop and compares the result of the difference to an estimated load voltage. For each iteration the estimated load voltage is re-estimated until the difference result equals the estimated voltage, thereby determining the actual load voltage. Knowing the actual load voltage, permits determination of actual current and power values which are compared to collected substation current and power values. If the values are equal, the effects of the harmonics are known. If the values are not equal, load composition data is adjusted and the system repeats the above until the values are equal.

12 Claims, 7 Drawing Sheets

| $V_L$ | $I_1$ (fundamental) | | $I_2$ (2nd harmonic) | | $I_3$ (3rd harmonic) | | ... | $I_n$ (n th harmonic) | |
|---|---|---|---|---|---|---|---|---|---|
| | amplitude | phase | amplitude | phase | amplitude | phase | | amplitude | phase |
| 130 | | | | | | | | | |
| 120 | | | | | | | | | |
| 110 | | | | | | | | | |
| 100 | | | | | | | | | |

FIG. 6

| $V_L$ | $I_1$ (fundamental) | | $I_2$ (2nd harmonic) | | $I_3$ (3rd harmonic) | | $I_4$ (4th harmonic) | | $I_5$ (5th harmonic) | |
|---|---|---|---|---|---|---|---|---|---|---|
| | amplitude | phase | amplitude | phase | amplitude | phase | amplitude | phase | amplitude | phase |
| 130 | | | | | | | | | | |
| 120 | | | | | | | | | | |
| 110 | 1.0 | 4.6° | 0.0 | 0° | 0.84 | 169° | 0.0 | 0° | 0.57 | -20° |
| 100 | | | | | | | | | | |

APPARATUS AND METHOD FOR DETERMINING THE EFFECTS OF HARMONICS ON ELECTRIC POWER SYSTEMS

BACKGROUND OF THE INVENTION

1. Field of the Invention

The present invention relates to a method for determining the effects of linear and non-linear loads on electric power systems. More particularly, the present invention relates to a method which determines load current spectra for current flowing in primary conductors which connect power substations to distribution transformers and the load current spectra of current flowing in the secondary windings of the distribution transformers. The method also collects the voltage waveforms at load busses which distribute power to customers and compares the actual substation meter readings with customer metered power and volt-ampere demand, so as to provide electric utilities with information relating to the quality of the supplied power and to facilitate implementation of corrective measures.

2. Description of the Related Art

The quality of electric power supplied by electric utilities is often degraded by harmonics, outages, reduced voltage, flicker, spikes, etc. Most significantly, nonlinear switching-type loads, which introduce harmonics into the system, are a major problem in power quality. Nonlinear devices are not new to electric power systems. Transformers, iron-cored machinery and fluorescent lighting are obvious examples. However, until very recently their nonlinear characteristics were not a problem for electric utilities, since the types of loads which introduce harmonics onto the line were at a minimum and the utilities had developed corrective measures to offset the harmonics generated by those loads. For instance, the ever-present third harmonic was confined to delta-connected windings so that utilities simply had to use delta-wye distribution transformers to reduce the impact of the third harmonic.

Recently new developments in electrical and electronic loads, e.g., in computers, solid-state power conditioners and fluorescent lighting, have brought about a proliferation of power system components and loads having nonlinear characteristics. As a result, the desire to improve the quality of the power supplied to customers has been elevated to a new awareness. One major problem associated with harmonics in the power system is that they reduce the ability of electrical utilities to predict accurately the effects of reducing the voltage during summer peaks in order to reduce the system load.

Practically, the harmonic components of current generated by the non-linear loads create corresponding harmonic components of voltage across the network impedances. As a result, a distortion of the current and voltage waveshapes from sinusoidal occur, thereby rendering the classical power triangle insufficient for power-factor (PF) evaluations.

Figure 1:
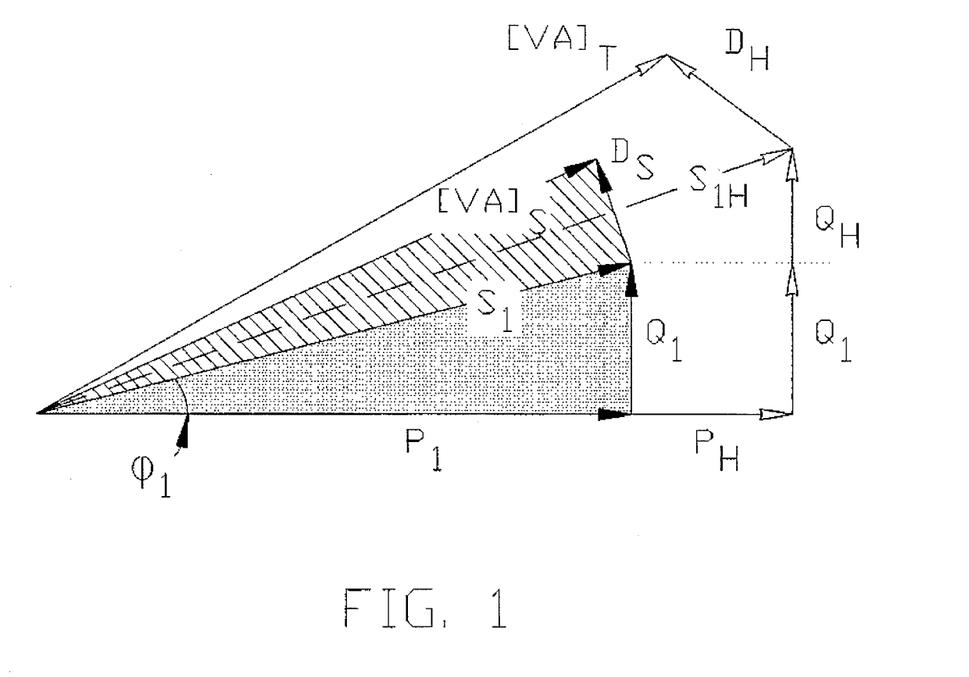
FIG. 1 is a phasor power diagram representing the harmonic content of power supplied to customers.

One way to determine the harmonic content of the power supplied to customers, utilizes a power diagram of the electrical network, shown in FIG. 1, which illustrates the combination of two power-phasor diagrams. The first phasor diagram consists of the two inner gray and pattern filled triangles, which reflects an electrical network that has non-linear loads, and a power supply defined by a sine-wave voltage. In this instance, the fundamental rms value of the phase voltage $V_1$ is the same as the total rms value of the voltage ($V_{rms}$) and is represented below in equation one (1):

$$V_1 = V_{rms} \quad (1)$$

The rms value of the phase current, which in this instance has a high harmonic content, is represented by:

$$I_{rms} = \sqrt{I_1^2 + \sum_{n=2}^{\infty} I_n^2} = \sqrt{I_1^2 + I_{ac}^2} \quad (2)$$

where n denotes the current harmonic number. In the gray-filled triangle of FIG. 1, the active power ($P_1$) per phase is represented in equation three (3) below. The active power ($P_1$) relates to the fundamental components of the voltage ($V_1$), the current ($I_1$), and the phase angle $\phi$ between $V_1$ and $I_1$:

$$P_1 = V_1 I_1 \cos \phi_1 \ [W] \quad (3)$$

A wattmeter is utilized to measure the active (or real) power ($P_1$). The reactive power $Q_1$ per phase, represented in equation four below, also relates to the fundamental values of voltage ($V_1$), the current ($I_1$), and the phase angle $\phi_1$ between $V_1$ and $I_1$:

$$Q_1 = V_1 I_1 \sin \phi_1 \ [var] \quad (4)$$

A varmeter is utilized to measure the reactive power $Q_1$. The apparent power $S_1$ is defined by:

$$S_1 = V_{rms} I_1 = \sqrt{P_1^2 + Q_1^2} \ [VA] \quad (5)$$

and is also a function of the fundamental components of the voltage $V_1$ and current $I_1$. The apparent power is a calculated quantity often used as a rating unit and it cannot be measured by standard meters. One of the reasons is that the current harmonics generated by non-linear loads introduce an additional distortion power $D_s$ represented in equation six (6) below which prevents accurate readings:

$$D_s = V_{rms} I_{ac} \ [VA] \quad (6)$$

Multiplying both sides of equation two (2) above by $V_{rms}$, the total power in volt-amperes $[VA]_s$ can be obtained, and is represented by equation seven (7) below:

$$[VA]_s^2 = (V_{rms} I_{rms})^2 = S_1^2 + D_s^2 \ [VA] \quad (7)$$

Equation seven (7) can be illustrated such that the three phasors $[VA]_s$, $S_1$ and $D_s$ constitute a right-angle triangle, and is shown in FIG. 1 by the pattern-filled triangle. The product of the readings of input ac voltmeter and ac ammeter provides the total $[VA]_s$.

The power factor PF is defined as the ratio of active power ($P_1$) per total voltamperes ($[VA]_s$) and is represented in equation eight (8) below. As can be seen from equation eight (8), the actual power factor PF does not agree with the classical representation of the power factor, i.e. PF≠cos $\phi_1$. This is due to the harmonic components caused by the load.

$$PF = \frac{P_1}{[VA]_S} \quad (8)$$

The second phasor diagram shown in FIG. 1 is the outer diagram. The second phasor diagram relates to an electrical network having nonlinear loads which are supplied by a distorted voltage wave. The two phasor diagrams of FIG. 1, i.e., the inside and the outside diagrams, correspond to loads that have the same fundamental voltage ($V_1$), current, ($I_1$), and phase angle ($\phi_1$). The total rms value of the voltage in this case is represented below in equation nine (9):

$$V_{rms} = \sqrt{V_1^2 + \sum_{m=2}^{\infty} V_m^2} = \sqrt{V_1^2 + V_{ac}^2} \quad (9)$$

where m denotes the voltage harmonic number. The rms value of the current is represented by equation two (2). In instances where n=m, i.e. when the same harmonic component is present in both the current and the voltage, the product power which is represented as the voltage times the current will introduce average values per cycle for the total active and reactive power for the harmonic components, as represented by equation ten (10) below:

$$\left. \begin{array}{l} P_H = \sum_{i}^{\infty} V_i I_i \cos \phi_i \quad [W] \\ \text{for } n=m \\ \\ Q_H = \sum_{i}^{\infty} V_i I_i \sin \phi_i \quad [VAr] \\ \text{for } n=m \end{array} \right\} \quad (10)$$

Generally, a standard wattmeter is utilized to measure $P_1+P_H$. A digital varmeter is needed to measure $Q_1+Q_H$. With these known values, it is possible to calculate a value for the apparent harmonic power $S_{1H}$ as shown in equation eleven (11) below:

$$S_{1H} = \sqrt{(P_1+P_H)^2 + (Q_1+Q_H)^2} \quad [VA] \quad (11)$$

However, as noted above, the apparent power is a calculated quantity often used as a rating unit, and does not provide suitable information in analyzing the system behavior. Furthermore, a supplemental harmonic distortion power $D_H$ prevails due to the product of other harmonics where m≠n, and this value also cannot be measured.

The total power of the network in volt-amperes is represented below in equation twelve (12):

$$[VA]_T = V_{rms} I_{rms} \quad [VA] \quad (12)$$

Currently, the total volt-ampere power can be obtained by multiplying the measured value of an ac voltmeter by the measured value of an ac ammeter. The power factor PF is represented below in equation thirteen (13):

$$PF = \frac{(P_1+P_H)}{[VA]_T} \quad (13)$$

Generally, the parameters of interest to electric utilities in determining the quality of the power supplied to customers include:

(1) the effective (active) power $P=P_1+P_H$;
(2) the effective harmonic power $P_H$;
(3) the fundamental reactive power $Q_1$; and
(4) the total power $[VA]_T$.

The effective power (P) and the total power ($[VA]_T$) define the power factor (PF) for the system, i.e., $PF=P/[VA]_T$. The fundamental reactive power $Q_1$, is the dominant component of the reactive power, which when $Q_1$ exceeds a predefined value alerts an electric utility to an extreme demand in reactive power. The harmonic power ($P_H$) indicates the amount of harmonics polluting the network which permits an electric utility to assess the need for special filters or other measures to decrease the effects of the harmonic power.

For linear loads, the values of $P_1$, $Q_1$ and $S_1$ for an individual load are easily ascertained from measurements obtained from standard meters, e.g, a wattmeter, a voltmeter and an ammeter. For a linear composite load, the active power in watts and the reactive power VARs for individual loads may be added to find the total $P_1$ and $Q_1$, and hence the total apparent power $S_1$. However, for nonlinear loads, the harmonic components of current in the individual loads must be summed taking their phases into account. This phase information is essential and cannot be retrieved by standard meters, e.g., wattmeter, varmeter, voltmeter or ammeter. Furthermore, this phase information cannot be retrieved even if the harmonic content of an individual load is measured by a spectrum analyzer.

Therefore, a need exists for a system which determines the current harmonic components for a plurality of loads which may be connected to power conductors, which collects substation voltage, current and power quantities, which calculates the actual load voltage taking into account the harmonic load characteristics and which compares the collected values to the actual values derived from the actual load voltage, to determine the effects of the harmonics on the power supplied to customers.

SUMMARY OF THE INVENTION

The present invention relates to a system for determining the effects of linear and non-linear loads on electrical power systems. The system includes collection means for collecting power parameters, such as current, voltage and power values, at an electrical substation bus, and database means for storing tabulated practical voltage depended load current spectra, otherwise defined as the load characteristic data, for a plurality of loads. Voltage determining means is electrically related to the data base means and is configured to retrieve the load characteristic data therefrom, to determine a voltage drop between the substation bus and an electrical load bus. Generally, the voltage drop is based upon an estimated load voltage, the load characteristic data and predefined network information, i.e., the impedance characteristics of the electrical components between the substation bus and the load bus. Preferably, the load characteristic data includes fundamental current amplitude and phase angle data and harmonic current amplitude and phase angle data. Once the voltage drop is ascertained, the actual load voltage at the load bus is determined by the voltage determining means. The actual load voltage is the difference between the substation voltage and the voltage drop.

The system of the present invention also includes, comparing means to determine actual current and power values based upon the actual load voltage, and to compare the actual current and power values to the current and power values collected from the substation bus. Means for adjusting the actual load voltage level is provided which adjusts the actual load voltage until the actual current and power values and the collected current and power values are equal. When these values are equal the effects of the harmonics seen by the substation are known and corrective measures may be implemented.

The present invention also relates to a method for determining the effects of linear and nonlinear loads on electrical power systems. Initially, current, voltage and power values are collected at an electrical substation bus and load characteristic data for a plurality of loads are collected and stored in a data storage unit. The voltage drop between the collected voltage value at the substation bus and an electrical load bus is then determined. Typically, the voltage drop is determined by summing the load characteristic data for each of a predetermined number of loads associated with an estimated load voltage to obtain an rms value for the current and by multiplying the rms current value by the impedance of the network between the substation bus and the load bus. The actual load voltage is then determined by subtracting the voltage drop from the collected voltage value. Once the actual load voltage is determined, the actual current and power values are derived. These actual current and power values are compared to the current and power values collected from the substation. If the compared values are equal the harmonic data introduced onto the feeder conductors is known, i.e., the harmonic data seen by the substation is known. If however, the compared current and power values are not equal, the actual load voltage is adjusted until the collected current and power values equal the actual current and power values.

Preferably, the load characteristic data represents complete current waveforms over a single cycle, for each type of load. The current waveform for each load is then decomposed into harmonic components.

Typical loads which introduce harmonic components onto the feeder conductors include, for example, refrigerators, air conditioners, ac motors, solid state power supplies, uninterruptable power supplies, variable speed drives, and fluorescent lights. Each load would be represented by a set of voltage-dependent currents, i.e., by the amplitudes and phases of the fundamental and the set of higher harmonics for the appropriate voltage level. The rms value of the composite current can be derived from equation two (2) above.

The actual load voltage ($V_L$) described above is determined by iteration. Initially, the load voltage is assumed to be sinusoidal, and an estimated value, such as 120 volts, is assigned to it. Then, the corresponding current (fundamental plus harmonics) flowing through each load component is retrieved from the database means. The total current flowing through the network impedance produces a set of voltage drops, one for each harmonic. The value of the actual load voltage ($V_L$) is calculated from the known value of the substation voltage ($V_s$) from equation fourteen (14) below. If, as expected this calculated value is not the same as the original assigned (or estimated) value, then the estimated load voltage is re-estimated and the above calculation is repeated until the actual load voltage equals the estimated load voltage. In equation (14), $$V_L = \sqrt{V_S^2 - \sum_{n=1}^{\infty} \left| n\omega L \cdot \sum_{j=1}^{K} I_{nj} \angle \theta_{nj} \right|^2} \quad (14)$$

L is the lumped feeder inductance, n is the order of the harmonic, j is the kind of load, K is the number of load units, $\omega$ is the line frequency, $I_{nj}$ is the current harmonic component as a function of the voltage and $\theta_{nj}$ is its phase angle. For simplicity, the resistance R of the feeder conductors is omitted from equation fourteen (14).

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

The present invention provides a system and method for measuring current waveforms at power load busses and for decomposing the current waveforms into harmonic components and deriving the quality of the power at the load bus, i.e., the quality of power supplied to customers.

In order to properly determine the power quality at the load bus, it is necessary to initially determine the effects of various loads on the bus. Typical loads include, for example, refrigerators, air conditioners, ac motors, which are considered as linear loads; and solid state power supplies, uninterruptable power supplies, variable speed drives and fluorescent lighting which are considered as nonlinear loads. Loads of these types introduce harmonic components onto the load bus, i.e., they create or generate distortion power.

Figure 2:
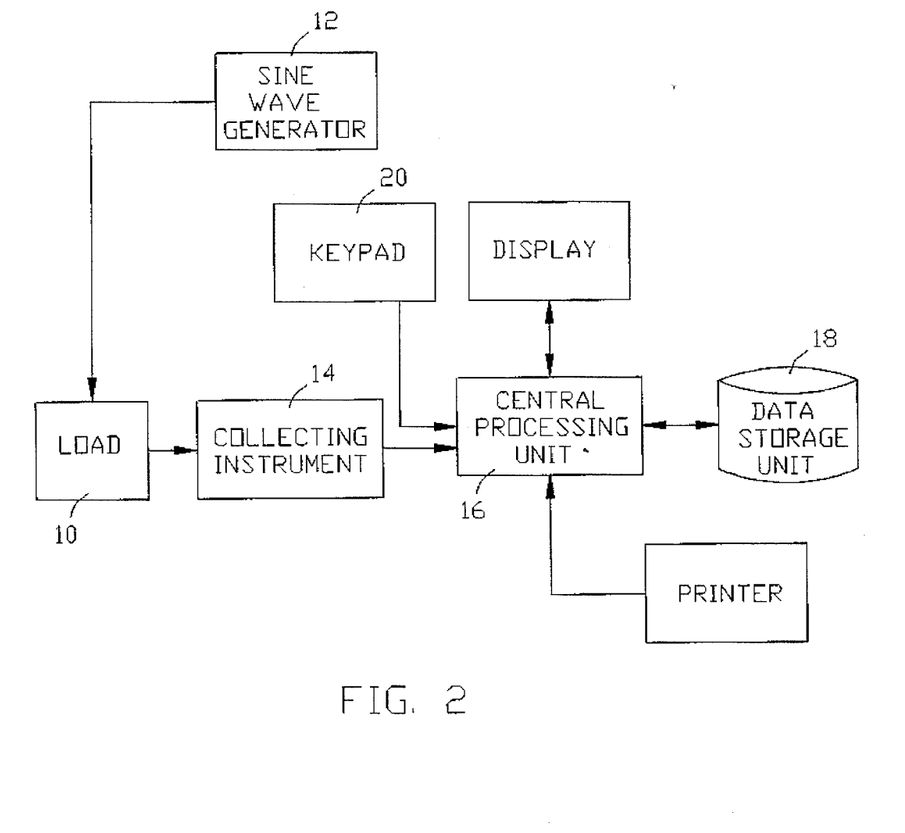
FIG. 2 is a functional block diagram of a load characteristic collection system according to the present invention.

To determine the effects of the various and numerous loads on the load bus voltage, initially each load 10 is individually connected to a source of a.c. power, e.g., a sine-wave generator 12, and to a signal collecting instrument 14, as shown in FIG. 2. An example of a suitable collecting instrument is a digital oscilloscope model DSA 602A, manufactured by Tektronix. The current waveform from the load is then collected (or measured) and the information therewithin is decomposed by collecting instrument 14 into its spectral (or harmonic) components, which includes the current amplitude and phase angle and is defined as the load characteristic data. The load characteristic data is then transmitted by the collecting instrument 14 to central processing unit 16. The central processing unit is preferably a microprocessor based controller having internal memory (e.g., RAM and ROM), stored programs (e.g., system and application) and communication interfaces. The central processing unit also includes known comparators to compare processed data and recursive adjusting means such as a recursive adjusting circuit and/or recursive filters to perform reiteration tasks as will be described below. Standard serial or parallel communication protocols may be utilized to transfer the waveform data to central processing unit 16.

Figure 3:
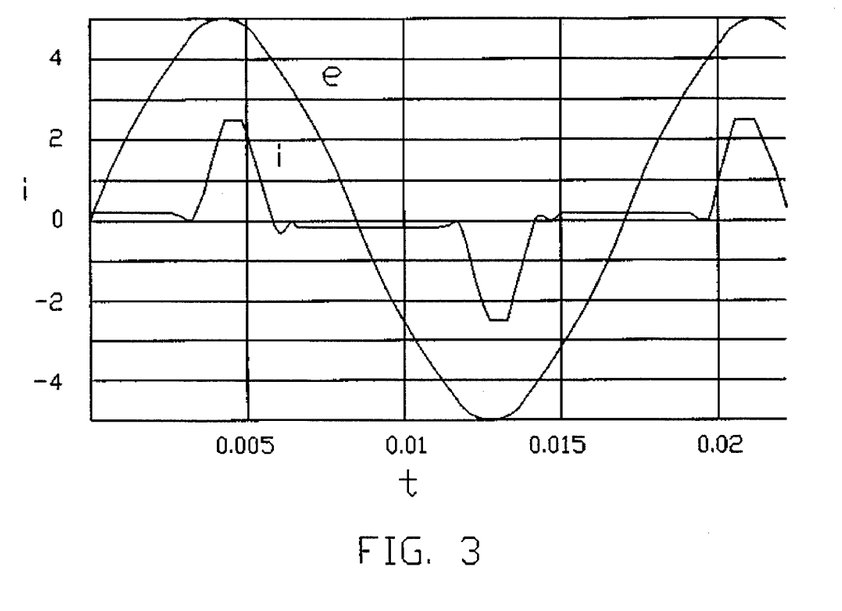
FIG. 3 is an exemplary current wave form for a personal computer load.
Figure 4:
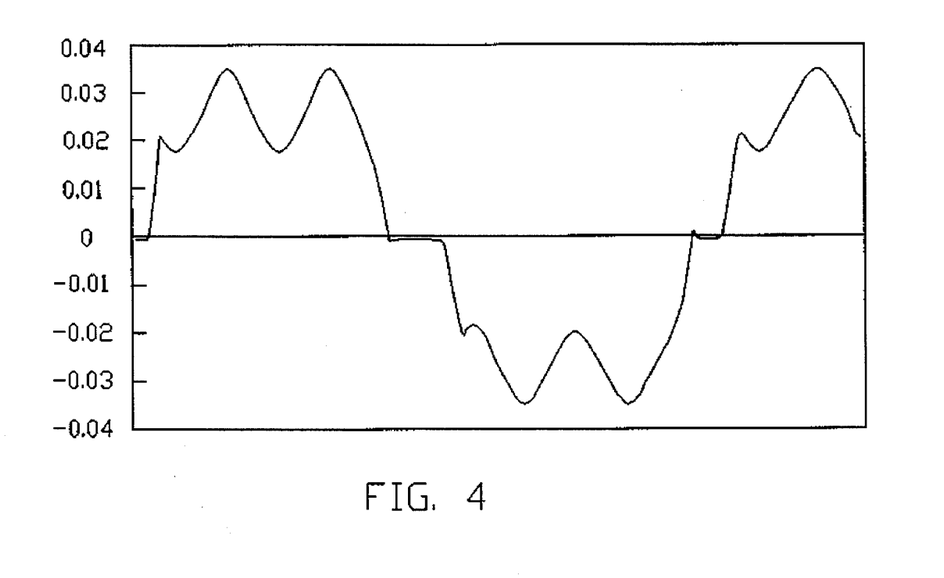
FIG. 4 is another exemplary current wave form for an adjustable speed drive system load.

Alternatively, the current waveform for each load may be collected by instrument 14 and transferred to central processing unit 16. Thereafter, the collected waveform is decomposed by central processing unit 16 into its spectral (or harmonic) components, e.g., the current amplitude and phase angle for each harmonic. The load characteristic data is then stored in data storage unit 18 to form a harmonic database. Exemplary current waveforms for a personal computer load and an adjustable speed drive system load are shown in FIGS. 3 and 4.

Figure 5:
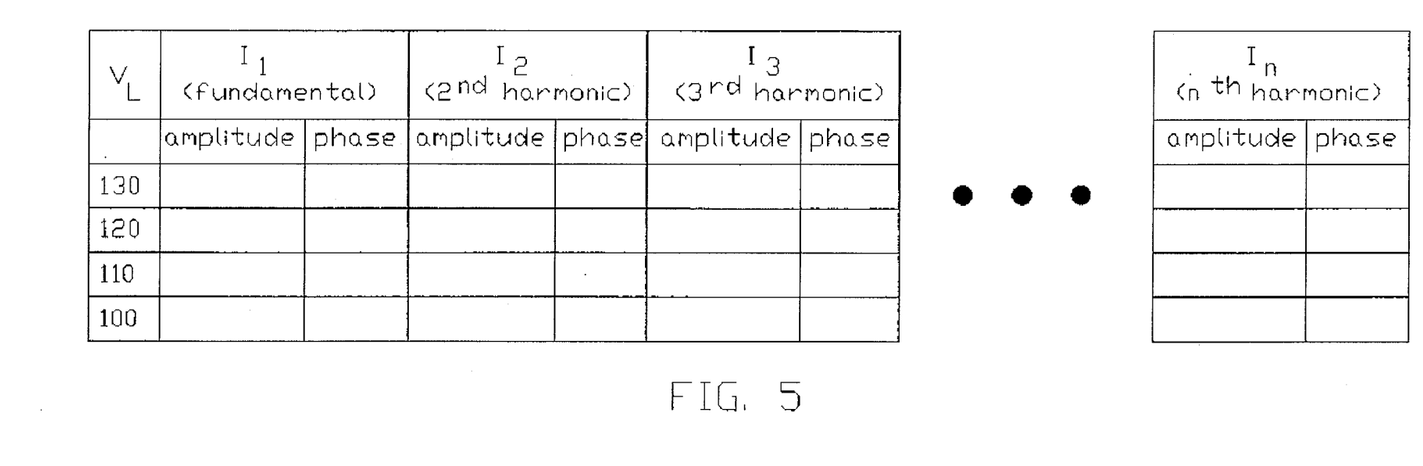
FIGS. 5 and 6 illustrate an exemplary format for storing load characteristic data in a data storage unit.
Figure 6:
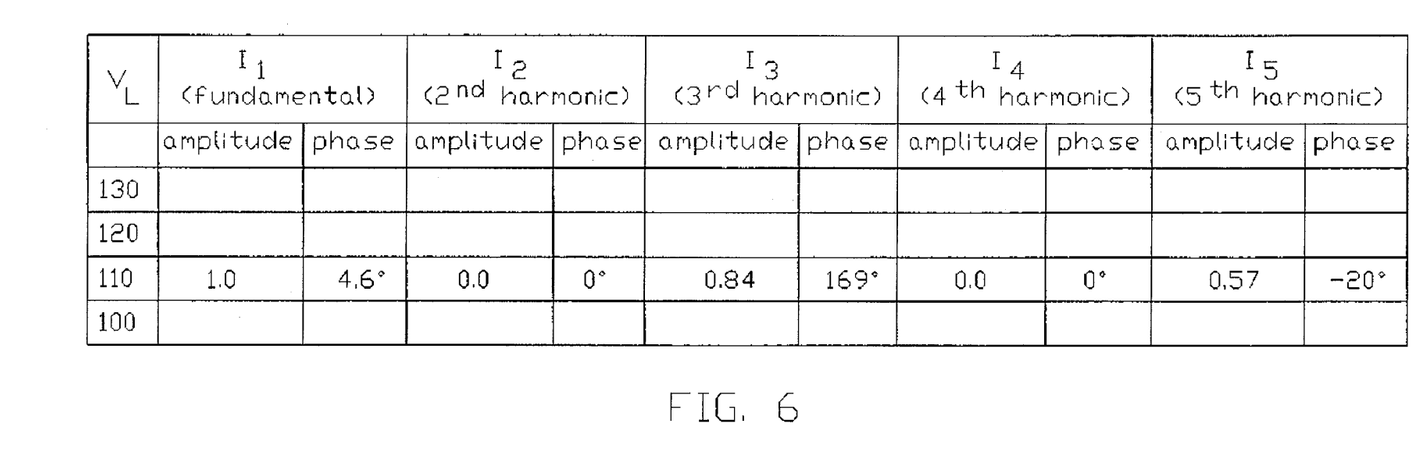

Preferably, the sine-wave generator voltage is varied over a predetermined range of between about 100 volts and about 130 volts a.c. and the harmonic components for each load at each voltage level are collected, derived and stored in the harmonic database. An example of a suitable format for storing the load characteristic data is shown in FIG. 5. As shown, the range of load voltage ($V_L$) is between 100 volts and 130 volts in 10 volt increments and the harmonic components range between the first harmonic (the fundamental) and the nth harmonic, where n is the order of harmonic associated with the particular load. A specific example of the load characteristic data for a personal computer is shown in FIG. 6.

Once the harmonic components for each type of load are collected, decomposed and stored in data storage unit 18, the harmonic database is complete. However, as new linear or nonlinear loads are ascertained and the waveforms collected, the database can easily be updated to include the harmonic components of the newly ascertained loads.

Figure 7:
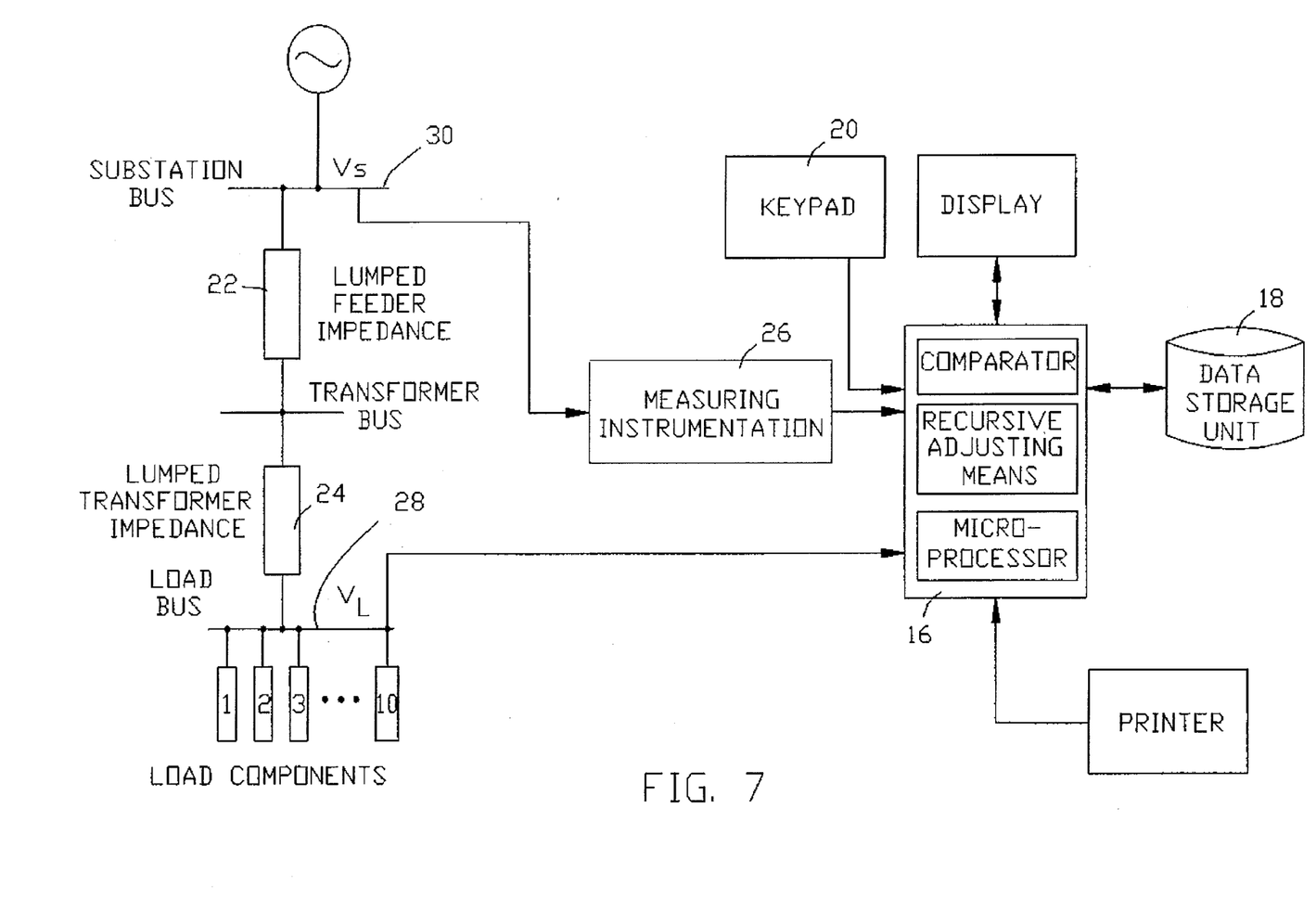
FIG. 7 is a block diagram of a system configuration according to the present invention, illustrating a central processing unit connected to a collecting instrument which is connected to a substation bus and a load bus.
Figure 8:
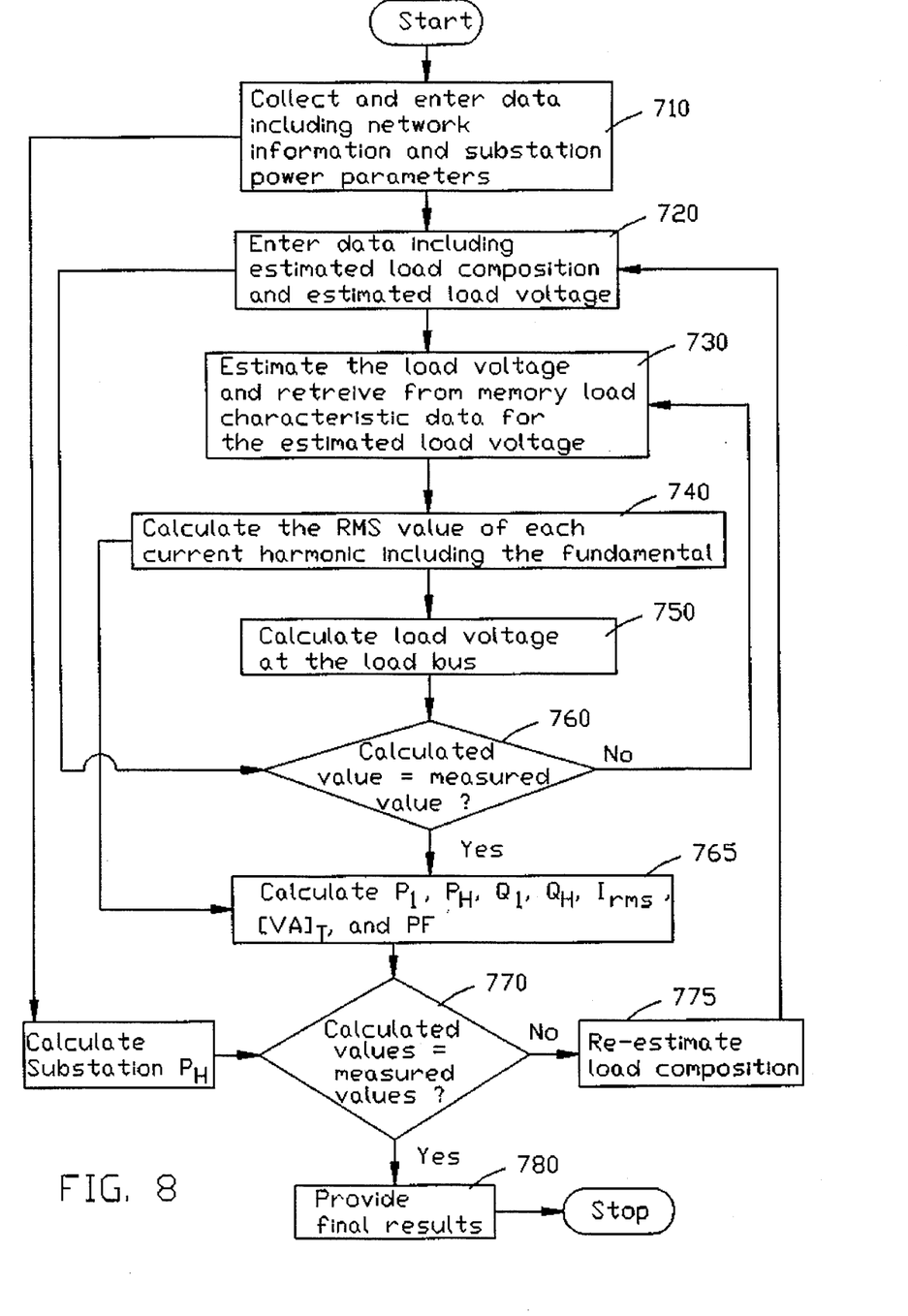
FIG. 8 is a flow-chart diagram for an exemplary program for determining the harmonic effects created by linear and nonlinear loads at an electrical substation.

Utilizing the system configuration of FIG. 7 and the flow diagram of FIG. 8, the quality of the power at the substation can now be ascertained. Initial data is entered into the central processing unit 16 via keypad 20 or through standard communication ports, e.g., serial or parallel ports, using known communication protocols (steps 710 and 720 as seen in FIG. 8). The initial data includes network information, substation power parameters, such as voltage, current and power values, estimated load composition data and the data within the harmonic database.

Figure 9:
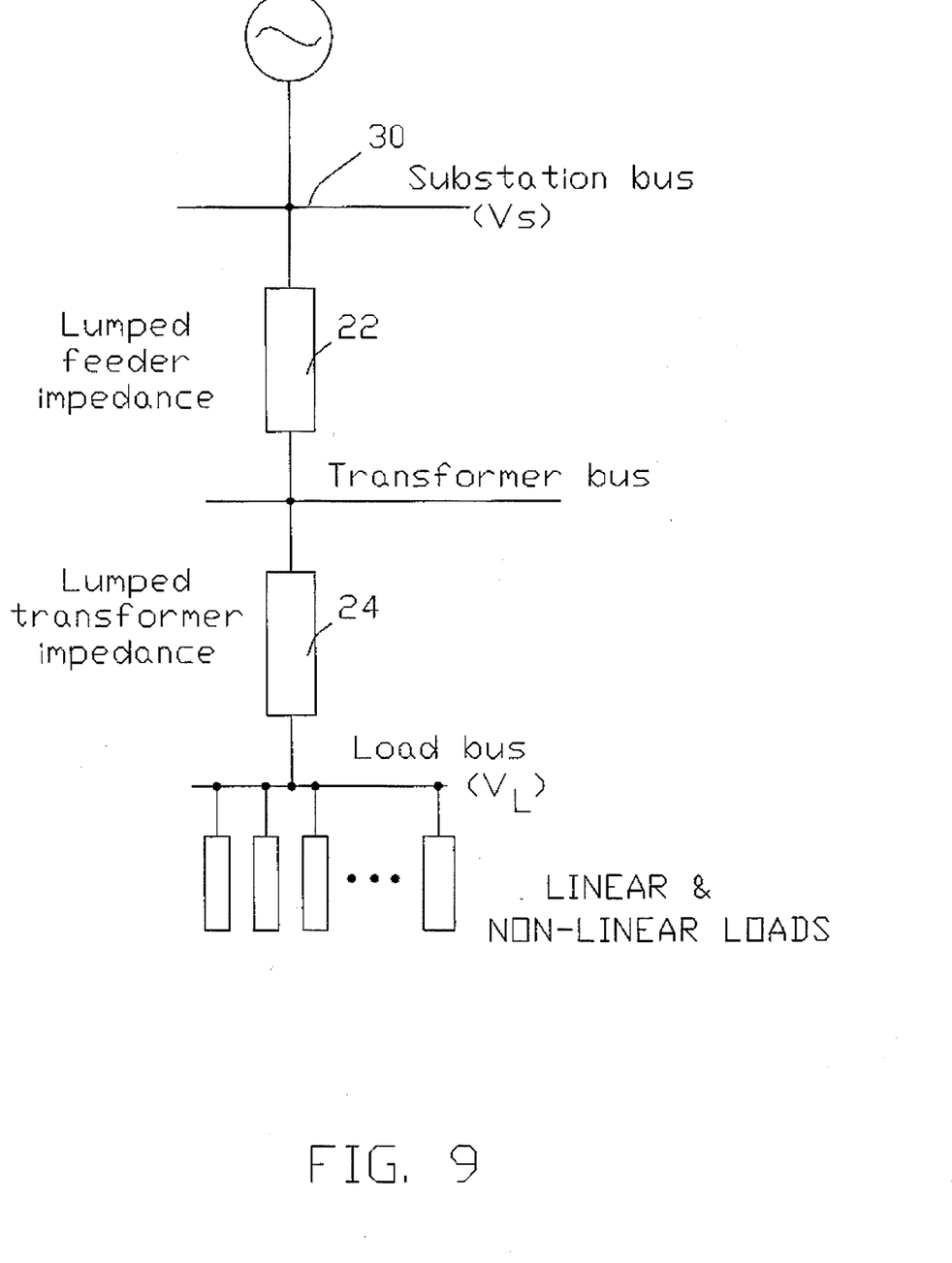
FIG. 9 illustrates an exemplary network configuration for an electrical power system shown in FIG. 7.

The network information, which is typically data supplied by the utility company and is schematically represented in FIG. 9, includes the lumped impedance characteristics for the feeder conductors 22 and the lumped transformer impedance characteristics 24. The feeder conductors impedance characteristics are dependent upon various factors, such as the length of the conductors and the wire size of the conductors (i.e., the wire gauge). The lumped transformer impedance characteristics are also dependent upon various factors, such as the types of transformers utilized in the network and the number of windings in the transformer coils. The network information is then stored in data storage unit 18.

The initial data also includes substation power parameters, such as voltage, current, power (active and reactive) and power factor values which are measured or collected by measuring instrumentation 26 as collection means and either manually entered into central processing unit 16 via keypad 20 or provided to central processing unit 16 via a serial or parallel communication port. The substation data is then stored in data storage unit 18. The measuring instrumentation may include, for example, a voltmeter, an ammeter, a wattmeter and/or a varmeter.

The initial data includes estimated load composition data which is preferably assigned to each load. The load composition data is a weighing factor which is based on the percentage of the total load in each particular load. This percentage is dependent on a predetermined total power value in volt-amperes. To illustrate, if a fluorescent lighting load is 40% of the total load, and the total power value is 100 kVA, the load composition data for the fluorescent lighting load is 0.4. As another illustration, if a refrigeration load is 15% of the total load and the total power value is 100 kVA, the load composition data for the refrigeration load is 0.15.

Once the initial data is entered into central processing unit 16, the load voltage ($V_L$) at the load bus 28 is estimated and the harmonic data for each load at the estimated load voltage is retrieved by CPU 16 from data storage unit 18 (step 730 of FIG. 8). Typically, the load voltage initially estimated to be 120 volts.

The voltage drop across the connection between the substation bus 30 and the load bus 28 is determined by determining the root mean square (rms) value for each current harmonic amplitudes from the harmonic database and summing the components with their phase angles and multiplying the summed current by the network data (step 740 of FIG. 8). The actual load voltage at the load bus 28 is then determined by subtracting the voltage drop between the substation bus 30 and the load bus 28 from the collected substation voltage (step 750 of FIG. 8). The actual load voltage is then compared to the estimated load voltage (step 760 of FIG. 8). If the actual load voltage does not equal the estimated load voltage, steps 730–760 are repeated and the load voltage is re-estimated, utilizing the recursive adjusting means of central processing unit 16, until the actual load voltage equals the estimated load voltage. Generally, for each reiteration above, when the load voltage is re-estimated, the new estimated voltage is a value selected between the old estimated voltage and the actual load voltage.

When the actual load voltage equals the estimated load voltage, then the harmonic components for each load will be known. To illustrate, if one of the loads connected to load bus 28 is a personal computer and if the actual load voltage is determined to be 110 volts then the load characteristic data, i.e., the harmonic components, for the personal computer load may be extended to the fifth harmonic and is shown in detail in FIG. 6. It should be noted in the example of FIG. 6, additional harmonic components above the 5th harmonic may exist, as such, the example of FIG. 6 is simply an illustration of the data format.

Once the actual load voltage and the load characteristic data are known, the actual power parameters are ascertained. Such power parameters include the actual current ($I_{rms}$), fundamental active and reactive power ($P_1$ and $Q_1$), harmonic active and reactive power ($P_H$ and $Q_H$), the actual power factor (PF), as well as the total power ($[VA]_T$) values which are calculated within central processing unit 16 using the above mathematical techniques (step 765). After the actual power parameters, e.g., the actual current and power values are calculated, they are compared to the power parameters collected from the substation, e.g., the collected current and power values, (step 770). For example, the actual $P_1$, $Q_1$ and $P_H$ are compared to the substation $P_1$, $Q_1$ and $P_H$. If the compared values match, then the calculated values of the current and the power, namely $I_{RMS}$, $P_1$, $P_H$, $Q_1$, $Q_H$, PF and $[VA]_T$ accurately represent the quality of the power distributed to customers. If the actual current, power and volt-ampere values do not match the substation values, the load composition is re-estimated (step 775) and steps 720 to 770 are repeated until a match exists between the actual current, power and volt-ampere values and the corresponding values collected from the substation.

When re-estimating the load composition utilizing the recursive adjusting means, the new load composition is based upon the comparison of the actual power values, i.e., $P_1$, $Q_1$ and $P_H$, with the input load composition estimates, and a set of conditions are implemented to re-estimate the load composition data. For example, if $P_{1(actual)} < P_{1(estimated)}$ and $Q_{1(actual)} = Q_{1(estimated)}$ and $P_{H(actual)} = P_{H(estimated)}$, then the load composition data relating to a fluorescent light load, which introduces high harmonic content, should be decreased. Another example of the conditions implemented is; if $P_{1(actual)} > P_{1(estimated)}$ and $Q_{1(actual)} < Q_{1(estimated)}$ and $P_{H(actual)} = P_{H(estimated)}$, then the load composition data relating to an air conditioner load, which introduces minimal harmonic content, should be increased, and the load composition data relating to a refrigerator load, which also introduces low harmonic content, should be decreased.

The central processing unit 16 then provides the actual voltage, current and harmonic characteristics which are seen at the substation (step 780). To illustrate, if the load connected to the network generates high harmonic components, the electric utility has to provide a total power value which is greater than the active power used by the load. Typically, for a personal computer, the total power value is 250 percent greater than the active power used by the computer. However, users generally only pay for the active power used by the load. As a result, the cost to provide the extra power (the greater volt-ampere value) must be absorbed by the utility or otherwise distributed over time. In this instance, knowledge of the harmonic content would enable the utility to implement corrective measures to recoup the costs associated with the additional power generated. As noted above, other problems associated with the harmonic content include neutral line overloading, transformer overheating, overloading of capacitor banks, nuisance tripping of circuit breakers, and the problems associated with the need to accurately predict the effect of voltage reductions and interference introduced onto telecommunication signals from the neutral line interference. Once the effects of the harmonics on the system power are ascertained, corrective measures may be implemented to solve these problems.

It will be understood that various modifications can be made to the embodiments of the present invention herein disclosed without departing from the spirit and scope thereof. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. An apparatus for determining harmonic characteristics of linear and nonlinear power loads based upon an estimated load voltage of an electrical load bus associated with said linear and nonlinear power loads, said apparatus comprising:

collection means for collecting power parameters as collected power parameters, including an active power value and a reactive power value associated with an electrical substation, at an electrical substation bus;

database means for storing load characteristic data including current amplitude and phase angle for a plurality of loads; and a processing unit, operatively connected to the collection means and the database means, the processing unit having a processor, a memory, and at least one stored program, the processing unit further including:

voltage determining means electrically connected to said database means and configured to retrieve said load characteristic data from said database means, to determine a voltage drop between said electrical substation bus and said electrical load bus based upon said estimated load voltage for said electrical load bus and said load characteristic data, to determine an actual load voltage at said electrical load bus, and to compare said estimated load voltage and said actual load voltage;

comparing means configured to determine actual power parameters based upon said actual load voltage and to compare said actual power parameters to said collected power parameters collected from said electrical substation bus; and means for recursively adjusting said estimated load voltage to equal said actual load voltage to establish a match of said compared actual power parameters and said collected power parameters to determine the harmonic characteristics of the linear and nonlinear power loads.

2. The apparatus according to claim 1, wherein said database means stores load characteristic data including fundamental current amplitudes and corresponding phase angle data and harmonic current amplitudes and corresponding phase angle data.

3. The apparatus according to claim 1, wherein said collection means collects power parameters including current, voltage and power values.

4. A method for determining harmonic characteristics of linear and nonlinear power loads based upon an estimated load voltage of an electrical load bus associated with said linear and nonlinear power loads, said method comprising:

collecting power parameters as collected power parameters associated with an electrical substation at an electrical substation bus using collection means;

collecting and storing signals in a database representing load characteristic data for a plurality of loads; and operating a processing unit including a memory and at least one stored program for performing the steps of:

determining a voltage drop between said collected voltage value at said electrical substation bus and said electrical load bus, said voltage drop being determined by using the processing unit which sums the load characteristic data for each of a predetermined number of loads based upon said estimated load voltage, and which subtracts said summed load characteristic data from said collected voltage value at said electrical substation bus to obtain an actual load voltage;

determining actual power parameters from said actual load voltage using the processing unit and comparing said actual power parameters with said collected power parameters collected from said electrical substation bus using the processing unit; and recursively adjusting said estimated load voltage using the processing unit to equal said actual load voltage to establish a match of said actual power parameters and said collected power parameters to determine the harmonic characteristics of the linear and nonlinear power loads.

5. The apparatus of claim 1 wherein the processing unit includes the voltage determining means for determining the actual voltage $V_L$ from the voltage drop $V_s$ associated with the substation bus according to:

$$V_L = \sqrt{V_S^2 - \sum_{n=1}^{\infty} \left| n\omega L \cdot \left( \sum_{j=1}^{K} I_{nj} \angle \theta_{nj} \right) \right|^2}$$

where L is a lumped feeder inductance, n is the order of the harmonic, j is a type of load, K is the number of load units, $\omega$ is a line frequency, $I_{nj}$ is a current harmonic component as a function of $V_s$, and $\theta$ is the phase angle of the current harmonic component.

6. The apparatus of claim 1 further comprising:

a signal collecting instrument for collecting the load signals from a plurality of loads corresponding to the load characteristic data.

7. The apparatus of claim 6 wherein:

the signal collecting instrument decomposes the load signals to a plurality of harmonics as the load characteristic data; and the database means stores the load characteristic data, including the plurality of harmonics, as a harmonic database.

8. The apparatus of claim 6 wherein:

the processing unit, responsive to the load signals, decomposes the load signals to a plurality of harmonics as the load characteristic data; and the database means stores the load characteristic data, including the plurality of harmonics, as a harmonic database.

9. The method of claim 4 wherein the step of determining the voltage drop includes the step of determining, using the processing unit, the actual voltage $V_L$ from the voltage drop $V_s$ associated with the substation bus according to:

$$V_L = \sqrt{V_s^2 - \sum_{n=1}^{\infty} \left| n\omega L \cdot \left( \sum_{j=1}^{K} I_{nj} \angle \theta_{nj} \right) \right|^2}$$

where L is a lumped feeder inductance, n is the order of the harmonic, j is a type of load, K is the number of load units, $\omega$ is a line frequency, $I_{nj}$ is a current harmonic component as a function of $V_s$, and $\theta$ is the phase angle of the current harmonic component.

10. The method of claim 4 wherein the step of collecting and storing includes the step of:

collecting load signals from a plurality of loads corresponding to the load characteristic data using a signal collection instrument.

11. The method of claim 10 wherein:

the step of collecting the load characteristic data from the plurality of loads includes the step of:
decomposing the load signals to a plurality of harmonics as the load characteristic data; and the step of storing includes storing the load characteristic data, including the plurality of harmonics, as a harmonic database.

12. The method of claim 10 further including the steps of:

decomposing the load signals to a plurality of harmonics as the load characteristic data using a processing unit; and storing the load characteristic data, including the plurality of harmonics, as a harmonic database.

* * * * *